United States Patent Office 2,991,762
Patented July 11, 1961

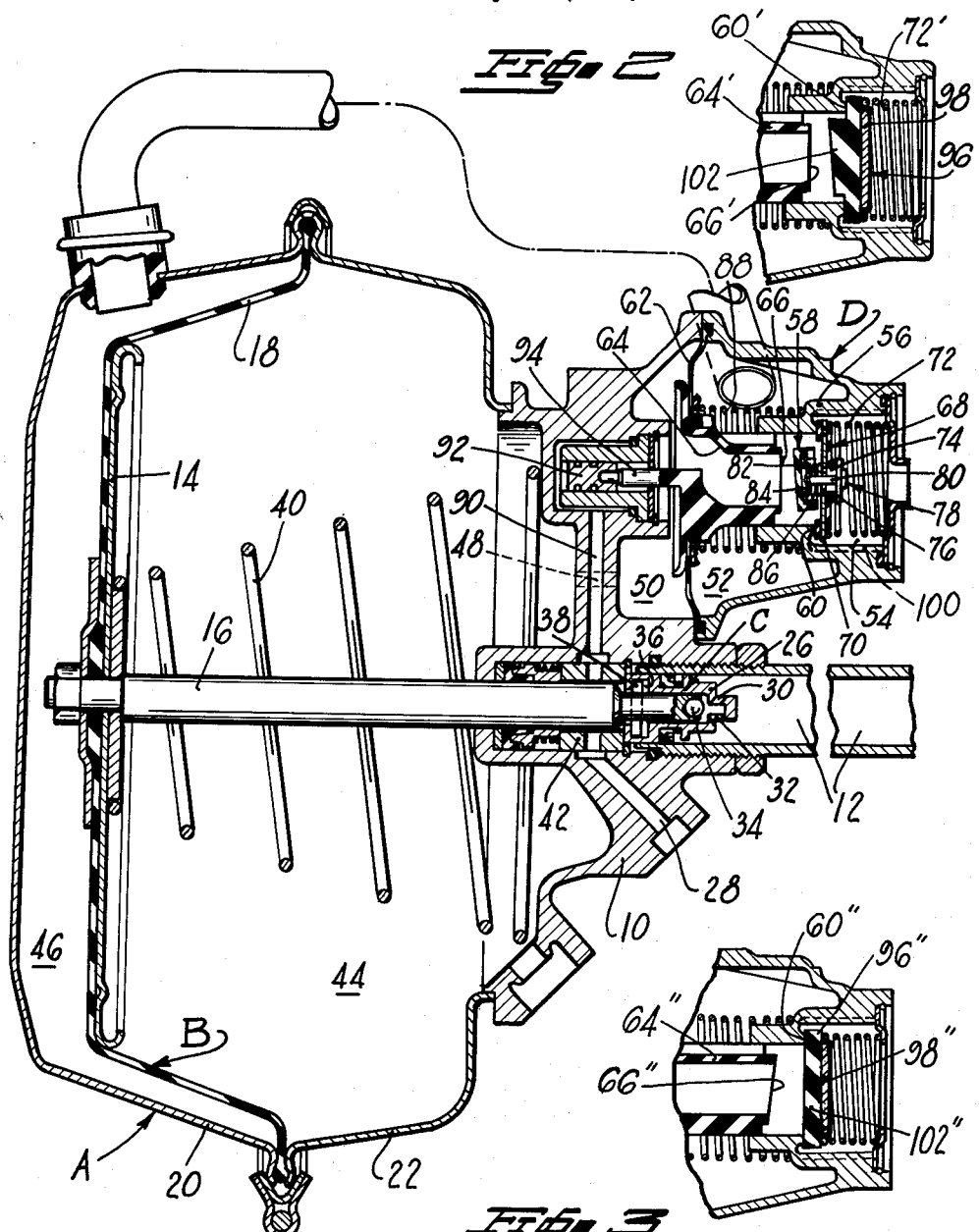

2,991,762
SINGLE POPPET CONTROL VALVE
Earl R. Price, John W. Blair, and Marvin L. Davis, South Bend, Ind., assignors to The Bendix Corporation, a corporation of Delaware
Filed Sept. 28, 1959, Ser. No. 842,920
4 Claims. (Cl. 121—46.5)

The present invention relates to single poppet control valves; and more particularly to the type of single poppet control valve used to control the actuation of pneumatically powered fluid pressure servomotors.

An object of the present invention is the provision of a new and improved type of single poppet control valve which is smoother acting and which is less noisy than the constructions used heretofore.

Another object of the present invention is the provision of a new and improved single poppet control valve in which at least one of the cooperating valve seats and poppet sealing surfaces are formed at a slight angle relative to the others so that they gradually engage each other during actuation of the valve.

A still further object of the present invention is the provision of a new and improved single poppet control valve of the above described type wherein at least one of the valve seats or poppet engaging surfaces is made of a sufficient thickness of a resilient material so that the resilient material will yield sufficiently to permit a complete contact and seal with its cooperating seating surface before the other of the poppet sealing surfaces is disengaged from its valve seating surface.

The invention resides in certain constructions and combinations and arrangements of parts, and further objects and advantages of the invention will become apparent to those skilled in the art to which the invention relates from the following description of the preferred embodiments described with reference to the accompanying drawing forming a part of the specification, and in which:

FIGURE 1 is a cross sectional view of a vacuum actuated servomotor driven hydraulic pressure intensifying unit of the type used to power actuate the hydraulic brakes of automotive vehicles;

FIGURE 2 is a fragmentary cross sectional view of another embodiment of the invention which can be used to replace the poppet construction shown in FIGURE 1; and FIGURE 3 is a fragmentray view similar to FIGURE 2 but showing still another embodiment of the invention which can be used to replace the single poppet control valve construction shown in FIGURE 1.

While the invention may be otherwise embodied, it is herein shown and described as embodied in the control valve of the general type of power actuated braking unit shown and described in the Earl R. Price Patent No. 2,654,224. The unit shown in the drawing generally comprises a servomotor A having a movable wall B therein which drives a hydraulic piston C to displace hydraulic fluid under pressure into the hydraulic braking system of an automotive vehicle. The movable wall B is power actuated by means of the vacuum to atmospheric air pressure differential that is generated by the internal combustion engine of the automotive vehicle; and control of the servomotor is had by means of the single poppet type of control valve indicated generally at D.

The servomotor A is formed by means of a two piece stamped housing that is suitably affixed to one end of a casting 10 which houses the hydraulic pressure generating cylinder 12 of the unit. The movable wall B is formed by means of a diaphragm plate 14 that is suitably bolted to the piston rod 16 and over which the center portion of a premolded diaphragm 18 is positioned. The outer peripheral edge of the diaphragm 18 is positioned between flanges on the two stamped sections 20 and 22 of the housing and is suitably clamped in place by a band which extends around the periphery of the flanges. Piston rod 16 extends through a suitable sealing structure into the hydraulic pressure generating cylinder 12 and is affixed to a piston head 26 that sealingly engages the sidewalls of the hydraulic cylinder 12.

Hydraulic pressure from the master cylinder, not shown, of the vehicle's hydraulic braking system is communicated to the region behind the piston head 26 by means of the hydraulic passageway 28; and the servomotor unit shown is of the type which will communicate this hydraulic pressure directly to the hydraulic chamber 12 and thence to the driven hydraulic braking system whenever power is not available to actuate the movable wall B. Piston head 26 is a generally cup-shaped structure, into which the end of the piston rod 16 extends; and a suitably hydraulic passage through the piston is provided around the end of the piston rod 16, and through drilled passageways 30 and 32 in the end of the piston head 26. The internal chamber of the cup-shaped piston head terminates in a valve seat which surrounds the adjacent end of the drilled passageway 30; and the adjacent end of the piston rod 16 is suitably provided with a hard metallic ball 34 which abuts this seat to both close off the passageway 30 and drive the hydraulic piston C into the hydraulic pressure generating cylinder 12. In order that communication will be provided between opposite sides of the piston head 26 during the normal deenergized condition shown in the drawing of the servomotor, an elongated cross hole 36 is provided in the sidewalls of the piston head 26 surrounding the end of the piston rod 16, and a cross pin 38 is pressed in place to provide a slight amount of lost motion between the piston rod 16 and the piston head 26. The piston rod 16 is normally urged to the left (as seen in the drawing) or at rest position by means of the movable wall return spring 40; and during this retractile movement, the end of the piston head 26 moves up against the end of the annular stop 42—following which further retraction of the rod 16 by the spring 40 pulls the ball 34 out of engagement with the valve seat surrounding the passageway 30. Rearward or retractile movement of the piston rod 16 is limited by engagement of the cross pin 38 with the left hand end of its receiving groove 36 in the piston head 26.

The servomotor A shown in the drawing is of the type which is vacuum submerged—so that in its normal deenergized condition, vacuum exists on both sides of the movable wall B. Vacuum from the manifold of the vehicle's propelling engine is continually communicated to the power chamber 44 on the front or right side of the movable wall B, and from there it is normally communicated to the rear power chamber 46 through passageway 48, and the servomotor unit's control valve structure D.

The control valve structure D is formed by means of a vacuum valve chamber 50 to which the passageway 48 always communicates, a control pressure chamber 52, and an atmospheric chamber 54 spaced apart in that order. Atmospheric pressure is continually communicated to the atmospheric chamber 54; and the atmospheric chamber 54 is separated from the valve's control pressure chamber 52 by means of a rigid partition 56 having a centrally located atmospheric valve port 58 therein and surrounding which is located the atmospheric valve seat 60. The vacuum valve chamber 50 and control chamber 52 are separated by a flexible diaphragm 62—the center portion of which is affixed to a tubular vacuum valve seat member 64. Vacuum from the chamber 50 is continually communicated to the central opening in the tubular valve seat member 64, and the opposite end of the tubular valve seat member projects into and is guided by the sidewalls of the atmospheric valve port 58. The end of the tubular valve seat member 64 terminates in a vacuum valve seat 66; and the control valve structure D is completed by means of a poppet structure 68 which is adapted to abut both the atmospheric valve seat 60 and vacuum valve seat 66 and simultaneously control the air flow therethrough.

While the poppet structure 68 may in some instances be formed in a single rigid piece, it is herein shown as being formed in two parts so that atmospheric communication with the control chamber 52 can be accomplished in two stages. The poppet structure 68 includes an annular disc portion 70 which is biased against the atmospheric valve seat 60 by means of a coil spring 72. The annular disc portion 70 is normally held in engagement with atmospheric valve seat 60, except during rapid actuation of the servomotor, and control of air flow into the valve is normally had through its central opening 74.

Control of the air flow through the central opening 74 of the annular disc 70 is had by means of the right hand flange 76 of a spool shaped poppet member 78 which flange 76 abuts the right hand or outer surface of the annular disc 70. The flange connecting center stem 80 of the spool shaped poppet member 78 extends through the central opening of the annular disc 70 and is guided with respect thereto by means of radially inwardly extending projections or fingers 82 which center and guide the stem 80; and the left hand end of the flange connecting stem 80 is rigidly fixed to a flange 84 for abutment with the end of the tubular vacuum valve seat member 64. The portion of the disc 70 which abuts the atmospheric valve seat 60, and the portions of the right and left hand flanges 76 and 84 of the spool shaped poppet member 78 which abut the disc 70 and the tubular vacuum valve seat member 64, are suitably coated with a synthetic rubber so as to provide a suitable seal with respect to their cooperating seats. In order that the right hand flange 76 will normally engage the disc member 70, a suitable coil spring 86 is interpositioned between the left hand flange 84 and the disc 70; and the tubular valve seat member 64 is normally held out of engagement with the left hand flange 84 by means of another coil spring 88 interpositioned between the tubular vacuum valve seat member 64 and the housing of the control valve structure.

Operation of the structure so far described is had by means of hydraulic pressure from the vehicle's master cylinder, not shown, which pressure is communicated to the pressure inlet passageway 28. As previously indicated, the unit shown in the drawing is in its normal de-energized condition, in which condition fluid pressure is permitted to flow from the passageway 28 around the right hand end of the push rod 16 into the central chamber off the cup-shaped piston head 26 and out through the drilled passageways 30 and 32 to the hydraulic pressure cylinder 12, which is always in communication with the brake motors of the vehicle. Fluid pressure from the passageway 28 is also communicated by means of a passageway 90 to the rear side of a hydraulic piston 92 which bears against the stem 94 of the tubular vacuum valve seat member 64 and causes it to overcome the valve return coil spring 88. As previously indicated, vacuum is continually communicated to the front power chamber 44, and thence through the passageway 48 to the vacuum chamber 50 and central opening of the tubular valve seat member 64. As increased hydraulic pressure is supplied to the rear side of the piston 92, the tubular valve seat member 64 is moved into engagement with the spool shaped poppet member 78 to close off further vacuum communication with the valve's control chamber 52 and the rear power chamber 46. A still further increase in hydraulic pressure against the piston 92 causes the tubular vacuum valve seat member 64 to overcome the combined force of the coil spring 86 and the air pressure tending to hold the flange 76 of the poppet member 78 against the annular disc 70; and once the flange 76 is moved out of engagement with the annular disc 70, air pressure is free to flow into the control chamber 52 and the rear power chamber 46. Air flow into the rear power chamber 46 continues until sufficient pressure has been developed in control chamber 52 to cause the diaphragm 62 to move the tubular valve seat member 64 rearwardly by an amount which will again bring the flange 76 into engagement with the annular disc 70 of the atmospheric poppet member 68. At this time, the forces acting on the hydraulic piston 92 will be in balance, and the valve structure D will remain in its lapped or sealing condition.

During the time that air pressure has been bled into the rear power chamber 46, sufficient force will be generated on the movable wall B to force the push rod 16 forwardly by a sufficient amount to cause the ball 34, which is mounted in its right hand end, to engage the piston head 26 and seal off communication between the passageway 28 and passages 30 and 32. Further movement of the push rod 16 to the right moves the piston head 26 out of engagement with its stop 42, and thereafter increases the pressure in the hydraulic pressure generating cylinder 12 which communicates with the brakes of the vehicle.

When it is desired to reduce the braking effort of the vehicle, a reduction in pressure from the master cylinder causes an unbalanced force on the hydraulic valve actuating piston 92 which permits the diaphragm 62 to move the tubular vacuum valve seat member out of engagement with the left hand poppet flange 84. Air pressure from the rear power chamber 46 thereupon flows through the valve control chamber 52 into the vacuum valve chamber 50 to thereafter be pulled away by the vacuum generating source. When the force being delivered to the brakes of the vehicle has been released to the desired value, further reduction in hydraulic pressure in the passageway 28 ceases. Air pressure from the air power chamber 46 will continue to decrease until such time as the force which it exerts on the valve diaphragm 62 plus the force of the valve return spring 88 just equals the hydraulic pressure which is being held upon the hydraulic valve actuating piston 92. When this occurs, the tubular vacuum valve seat member 64 will again move into engagement with, or lap, the vacuum flange 84 of the spool shaped poppet member 78, and further retraction of the piston head 26 ceases.

When it is desired to completely release the brakes, the hydraulic pressure in the passageway 28 is removed; whereupon the valve return spring 88 holds the tubular vacuum valve seat member 64 out of engagement with the vacuum valve flange 84 and all pressure unbalance is removed across the movable wall B. When this occurs, the push rod 16 and the piston head 26 move to the left, until the piston head 26 engages the stop 42; whereupon the piston head 26 remains stationary and further leftward movement of the push rod 16 pulls the ball 34 out of sealing engagement with the piston head 26 to thereby again establish communication between the hydraulic inlet passageway 28 and the hydraulic pressurizing chamber 12.

According to principles of the present invention, one of the seating surfaces of the poppet member 78 or its cooperating valve seats 60 and 66 is disposed angularly relative to its cooperating seating surface so that an unbalanced force is created upon the poppet member during its actuation which causes it to lift angularly from the other of its cooperating valve seats. By this expediency valve noise or "click" is greatly reduced, the force required to open the poppet is greatly reduced, and a more accurate metering of air flow is provided. In the structure shown in FIGURE 1 of the drawings, the valve seats 60 and 66 are formed normal to the axis of the tubular vacuum valve seat member 64 and the left flange 84 is nonparallel with or inclined to the flange 76, so that actuating movement of the tubular poppet member 64 first engages one side edge of the left flange 84 before the diametrically opposite side edge of its seat 66 engages the opposite side edge of the left flange 84. This produces an unbalanced force upon the right flange 76 which causes it to tilt or lift one side edge of the flange 76 away from its cooperating seating surface before its opposite side edge is lifted free from the annular disc 70. A sufficient thickness of rubber is provided on the flange 84 so that it will deform sufficiently to permit the total area of the vacuum valve seat 66 to engage the rubber before sufficient force is transmitted from the seat 66 to the flange 58 to overcome the valve seating forces on the right hand atmospheric poppet 76, so that substantially no leakage takes place when the valve structure is in its lapped condition. It will be seen that the actuation of the spool shaped poppet member 78 therefore gives a smooth silent operation at or near the lap point of the valving structure. It will further be seen that the atmospheric flange or right hand poppet 76 is of quite small diameter, and is opened by a tilting action wherein only one of its side edges is unseated during the initial "cracking" of the valve. Whenever a fast actuation is required of the servomotor, continued movement of the tubular vacuum valve seat member 64 will move the flange 84 into abutment with the annular disc 70 and thereby move it out of engagement with the atmospheric valve seat 60—such that a large area is then provided for the flow of air pressure into the control chamber 52 of the servomotor.

The embodiment shown in FIGURE 2 of the drawings is generally similar to that shown in FIGURE 1, and differs principally in the manner in which the poppet member is made. Those portions in FIGURE 2 which are identical to corresponding portions of FIGURE 1 will be designated by a like reference numeral characterized further in that a prime mark is affixed thereto. The poppet member 96 shown in FIGURE 2 generally comprises a steel disc 98 having a reduced diameter section on its front or right hand face for retention in one end of the coil spring 72'. The outer periphery of the disc 98 rests upon a plurality of longitudinal ribs 100 to center and guide the poppet member with respect to the housing of the control valve. The rear or left face of the disc 98 is suitably coated as at 102 with a neoprene rubber to provide a flat outer surface for sealing abutment with the atmospheric valve seat 60', and a tapered center portion of varying thickness, so that its face which abuts the vacuum valve seat 66' forms a slight taper with respect to the valve seat 66'. The rubber coating is sufficiently resilient so as to permit the whole surface of the vacuum valve seat 66' to engage the rubber facing 102 before the force of the spring 72' is overcome and the poppet 96 is tilted out of engagement with the atmospheric valve seat 60'.

The embodiment shown in FIGURE 3 of the drawing is quite similar in many respects to that shown in FIGURE 2, but differs principally in the manner in which the necessary taper is provided between the poppet member and its engaging valve seat. Those portions shown in FIGURE 3 which correspond to like portions in FIGURE 2 carry a like reference numeral characterized further in that a double prime mark is affixed thereto. In the embodiment shown in FIGURE 3, the necessary taper is provided by angularly inclining the vacuum valve seat 66' with respect to the longitudinal axis of the tubular valve seat member 64", and the rubber coating 102" on the disc 98" is made of uniform thickness. As the tubular vacuum valve seat member 64" approaches the rubber coating 102" contact therebetween is initiated at one side of the vacuum valve seat 66", and thereafter the rubber coating 102" deforms sufficiently to permit the entire vacuum seat 66" to engage the rubber coating 102". It will be seen that, as in the preceding embodiments, the portion of the vacuum valve seat 66" which made the initial contact with the rubber coating 102" will deform the rubber coating by a greater amount than did the last portion of the seat to engage the rubber coating; and that therefore, there is a greater force exerted upon the rubber at the point of initial contact than is provided adjacent the last portion of the seat to contact the rubber. This creates an unbalanced force upon the poppet member 96" which causes the portion of the poppet member 96" adjacent to the point of the vacuum valve seat 66" which made initial contact with the poppet to lift the poppet 96" from the atmospheric valve seat 60" in a tilting manner. As in the previous embodiments, the initial "point" contact of the vacuum seat 66" with the rubber facing 102" reduces noise, and also reduces the force necessary to cause initial separation of the poppet member 96" from the atmospheric valve seat 60", so that a smaller control force can be used to actuate the valve.

While the invention has been described in considerable detail, we do not wish to be limited to the particular constructions shown and described; and it is our intention to cover hereby all novel adaptations, modifications, and arrangements thereof which come within the practice of those skilled in the art to which the invention relates.

We claim:

1. In valve mechanism and the like: first and second generally concentric valve seats, one of said seats being movable generally axially relative to the other of said valve seats, a generally rigid poppet member having a first surface adapted to be abutted by said first valve seat and a second surface adapted to be abutted by said second valve seat, said second valve seat and said second surface of said poppet member being formed at an angle relative to each other, whereby abutment of said second surface of said generally rigid poppet member by said second valve seat tilts said first surface of said poppet member angularly from said first valve seat.

2. In valve mechanism and the like: first and second generally concentric valve seats, one of said valve seats being movable generally axially relative to the other of said valve seats, a generally rigid poppet member having a first surface adapted to be abutted by said first valve seat and a second surface adapted to be abutted by said second valve seat, said second valve seat and said second surface of said poppet member being formed at an angle relative to each other, whereby abutment of said second surface of said generally rigid poppet member by said second valve seat tilts said first surface of said poppet member angularly from said first valve seat, at least one of said first and second valve seats and poppet surfaces being of a resilient material which permits complete engagement of said second seat and poppet surface before separation of said first seat and poppet surface.

3. In valve mechanism and the like: first and second generally concentric and nonparallel valve seats, one of said seats being movable generally axially relative to the other of said seats, a generally rigid poppet member having a first surface normally in engagement with said first valve seat and a second surface adapted to be abutted by said second valve seat, said first and second surfaces of said poppet member being generally parallel, and said first and second valve seats being nonparallel whereby abutment of said second surface of said generally rigid poppet member by said second valve seat tilts said first surface of said poppet member angularly from said first valve seat and at least one of said first and second valve seats and poppet surfaces being of a resilient material which permits complete engagement of said second seat and poppet surface before separation of said first seat and poppet surface.

4. In valve mechanism and the like: first and second generally concentric and parallel valve seats, one of said seats being movable generally axially relative to the other of said seats, a generally rigid poppet member having a first surface normally in engagement with said first valve seat and a second surface adapted to be abutted by said second valve seat, said first and second surfaces of said poppet member being nonparallel, whereby abutment of said second surface of said generally rigid poppet member by said second valve seat tilts said first surface of said poppet member angularly from said first valve seat and at least one of said first and second valve seats and poppet surfaces being of a resilient material which permits complete engagement of said second seat and poppet surface before separation of said first seat and poppet surface.

No references cited.

UNITED STATES PATENT OFFICE

CERTIFICATION OF CORRECTION

Patent No. 2,991,762                          July 11, 1961

Earl R. Price et al.

It is hereby certified that error appears in the above numbered patent requiring correction and that the said Letters Patent should read as corrected below.

Column 2, line 23, after "head" insert -- 26 --; column 3, line 55, for "off" read -- of --; column 6, line 59, strike out the comma; line 60, after "nonparallel" insert a comma.

Signed and sealed this 24th day of April 1962.

(SEAL)
Attest:

ESTON G. JOHNSON
Attesting Officer

DAVID L. LADD
Commissioner of Patents